March 13, 1934.  W. J. BAUMBERGER  1,950,936
GRINDING MACHINE
Filed April 18, 1929   5 Sheets-Sheet 1

INVENTOR
William J. Baumberger
BY
Evans & McCoy
ATTORNEYS

March 13, 1934.   W. J. BAUMBERGER   1,950,936
GRINDING MACHINE
Filed April 18, 1929   5 Sheets-Sheet 2

INVENTOR
William J. Baumberger
BY
Evans & McCoy
ATTORNEYS

Fig. 4.

March 13, 1934. W. J. BAUMBERGER 1,950,936
GRINDING MACHINE
Filed April 18, 1929 5 Sheets-Sheet 5

INVENTOR
William J. Baumberger
BY
Evans & McCoy
ATTORNEYS

Patented Mar. 13, 1934

1,950,936

UNITED STATES PATENT OFFICE 1,950,936

GRINDING MACHINE

William J. Baumberger, Davenport, Iowa, assignor, by mesne assignments, to The Micro Corporation, Bettendorf, Iowa, a corporation of Delaware Application April 18, 1929, Serial No. 356,047

9 Claims. (Cl. 51—50)

This invention relates to a vertical spindle machine for generating surfaces of revolution and more particularly to a vertical spindle grinding machine for finishing surfaces of circular form in horizontal cross section such as cylindrical bores.

The present invention has for an object to provide a machine in which relatively heavy work pieces may be quickly and easily mounted on or removed from the work support.

A further object is to provide a rotatable work support mounted for lateral movement with respect to the spindle for feeding the work to the grinding wheel or other tool carried by the spindle and to provide means for driving the work support to continuously rotate the work with respect to the spindle during operation of the machine.

A further object is to provide a work support which is movable laterally to a position clear of the spindle for loading or unloading the work support and to provide means for shifting the work support laterally at a relatively rapid rate to move the same to loading or unloading position or for moving the same at a relatively low speed for feeding the work to the grinding wheel or other tool carried by the spindle.

A further object is to provide a drive for the laterally shiftable work holder by which the speed of rotation of the work may be varied in small increments over relatively wide range of speeds so that the correct rate of travel of the grinding wheel over the surface of the work may be obtained.

A further object is to provide a power operated hoisting means as a part of the machine for loading and unloading the work holder.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Referring to the accompanying drawings, the machine of the present invention is mounted upon a base 1 which is provided with a central boss 2 in which is supported a vertical pivot pin 3. The base 1 is provided along the forward end thereof with an arcuate track 4 which supports the forward end of a sub-base 5, which is mounted on the base for pivotal movement about the vertical pivot pin 3, the sub-base having a forwardly extending arm 6 which has a bearing portion 7 resting on the arcuate track 4 and a rearwardly extending arm 8, which is provided at its rear end with a worm gear segment 9 which meshes with a worm 10 on a transverse shaft 11, which is journaled in brackets 12 attached to the base 1.

Rotatably mounted in the forward end of the sub-base 5, there is a work holder in the form of a table 13 which is provided with a central vertical trunnion 14 which extends down through the sub-base 5 and is mounted in a thrust bearing 15 supporting the trunnion of the lower portion of the sub-base and in a bearing 16 supporting the trunnion in the top portion of the sub-base. The sub-base carries an annular track member 17 upon which there is mounted a peripheral bearing ring 18 engaging the under side of the table 13 adjacent its periphery, a handle 19 being attached to the ring 18 so that it may be turned by hand when desired.

A large cast steel bevel gear 20 is attached to the under side of the table and this bevel gear is engaged by a bevel pinion 21 which is attached to the forward end of a drive shaft 22, which is journaled adjacent its forward end in the track member 17 and extends radially across the pivot 3 to a hydraulic motor 23 mounted on the rear or mate of the sub-base. By means of the motor 23, the work supporting table 13 can be rotated at any desired speed during the operation of the machine.

The work table 13 may be provided with any suitable work holding means in the form of a chuck for rigidly holding the work to be operated upon.

The specific work holding means employed is immaterial insofar as the present invention is concerned. However, as illustrated herein, the work table is adapted for supporting railway car wheels and is provided with a chuck of old and well known construction which has radially adjustable wheel supporting jaws 24 which are independently adjustable on radial serrated slides 25 mounted in radial grooves in the table and the jaws 24 are provided with serrated flanges 26 and clamping blots 27 by which the jaws may be rigidly secured in adjusted positions on the slides, the adjustment of the jaws and slides enabling the table to support wheels of different diameters. As is common practice in chucks of this character, the slides 25 may be simultaneously adjusted in or out by angular movements of the ring 18.

Immediately to the rear of the laterally adjustable work supporting table, there is a vertical standard 28 which has a widened hollow base portion 29 attached to the sides and rear ends of the base 1 and forming a housing for the rear end of the sub-base and the operating mechanism for a sub-base and for the work table. The standard 28 has a forwardly projecting upper end portion 30 to the forward end of which is attached a vertical guide member 31 in which is slidably mounted a vertically movable head or housing 32 in which the vertical spindle 33 is mounted.

The spindle 33 is journaled in bearings 34 and 35 adjacent the upper and lower ends of the head 32, the lower end of the spindle projecting through the lower end of the head and having attached thereto a suitable tool such as a grinding wheel 36. The spindle 33 is driven by an electric motor 37 mounted on the upper end of the head 32.

The weight of the vertically movable head 32 is counter-balanced by means of a counter-weight 38 within the upper portion of the standard, which is connected to the lower end portion of the head 32 by means of a cable 39 extending from the counter-weight over a guide sheave 40 mounted on the upper end of the standard.

The head 32 may be raised or lowered and reciprocating movement is imparted to the head 32 during the operation of the machine by means of a vertically disposed hydraulic cylinder 41 mounted in the guide member 31 and having a piston rod 42 rigidly attached to a flange 43 projecting rearwardly from the head 32 at its upper end.

Figure 1:
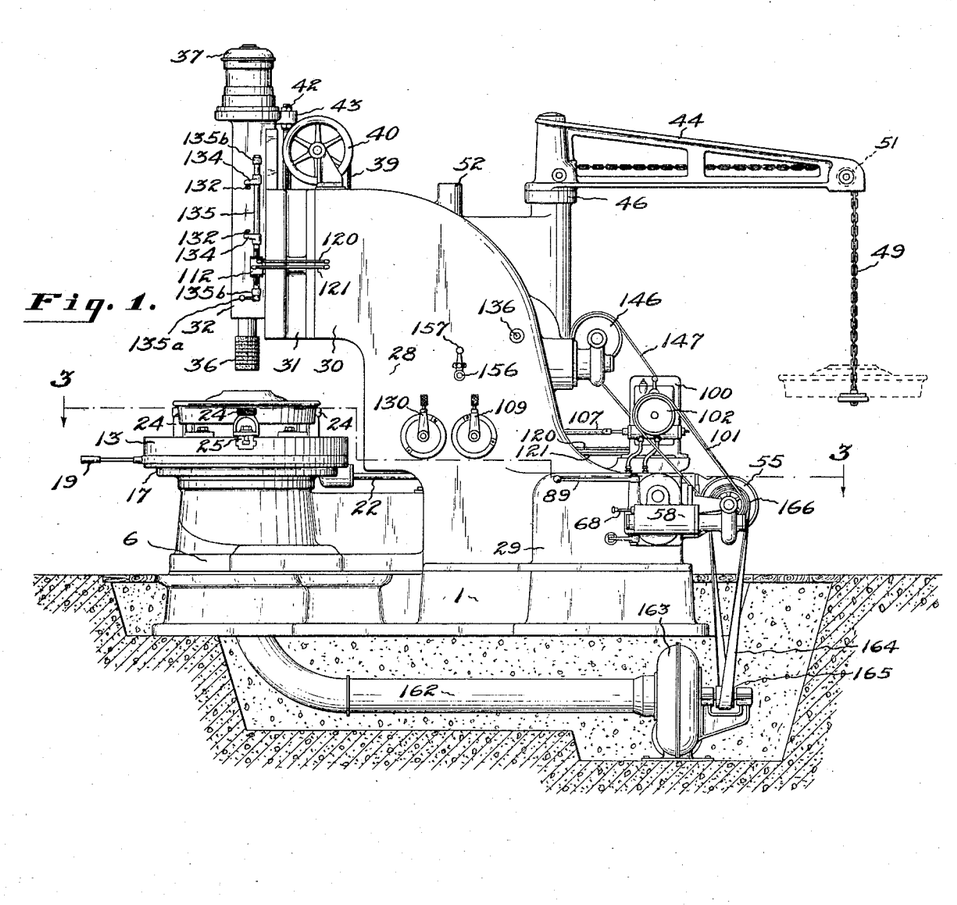
Figure 1 is a side elevation of the machine.
Figure 2:
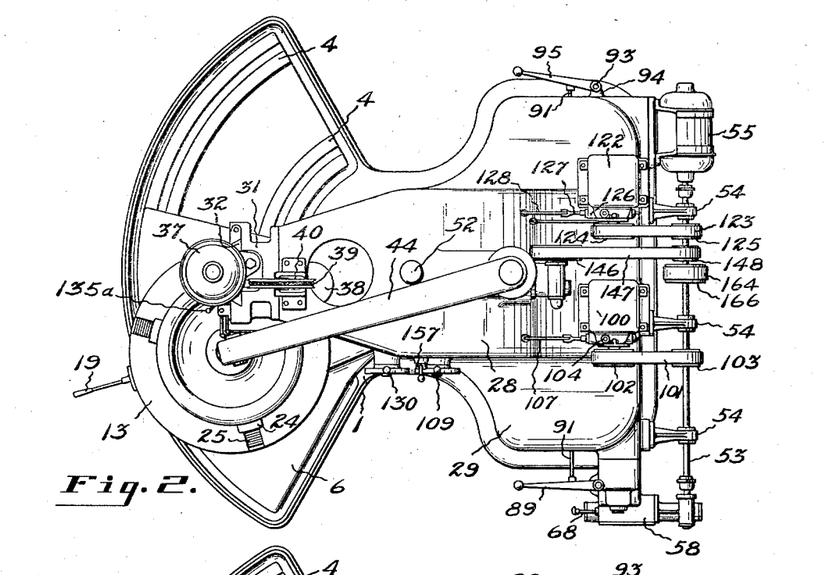
Fig. 2 is a top plan view of the machine.
Figure 3:
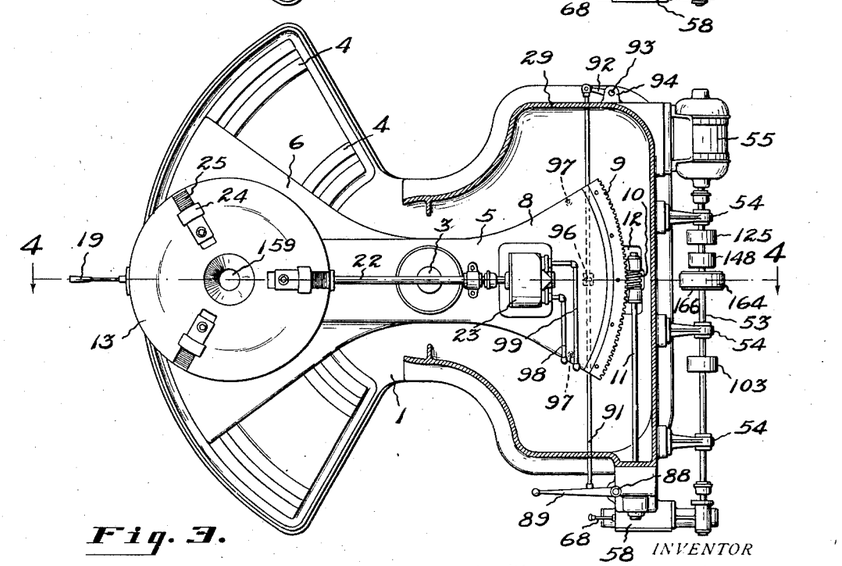
Fig. 3 is a horizontal section taken on the line indicated at 3—3 in Fig. 1.
Figure 4:
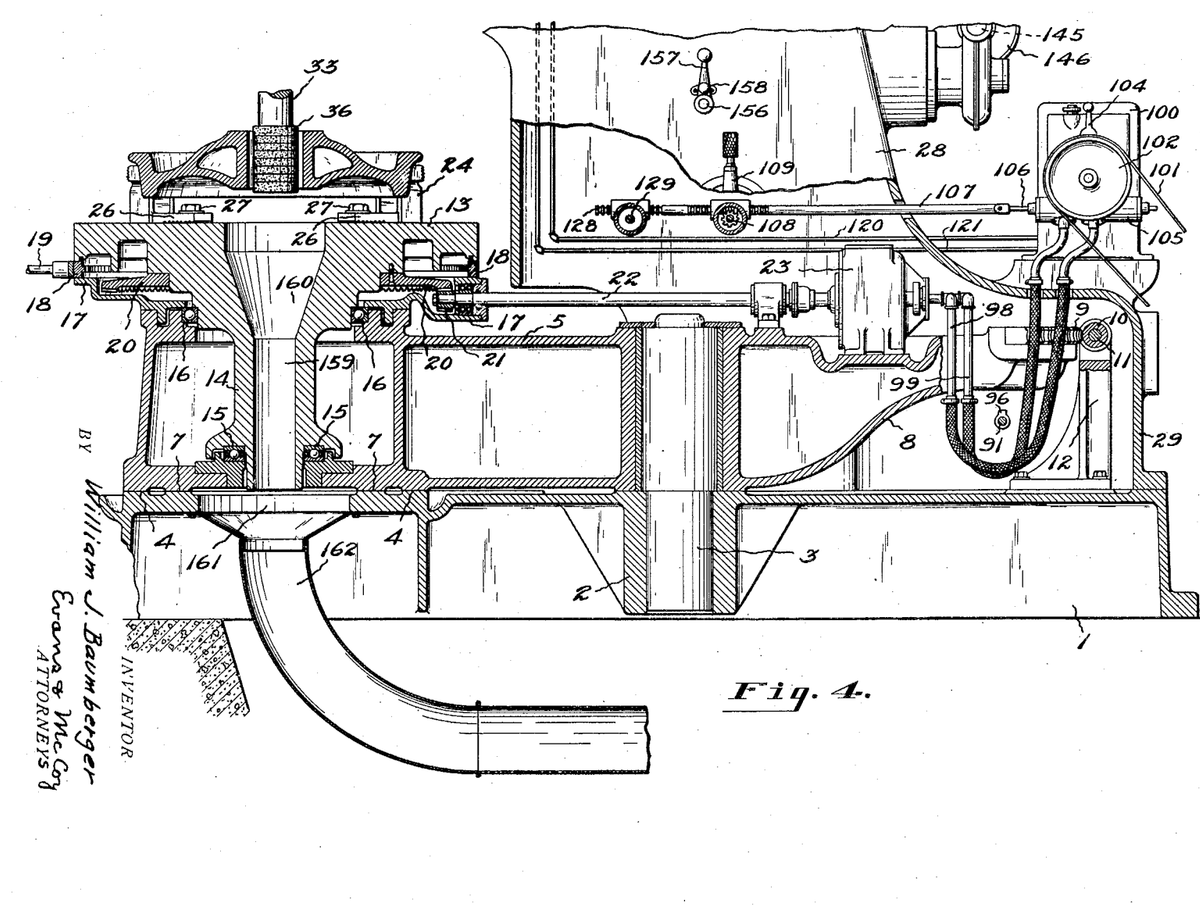
Fig. 4 is a vertical section through the base portion of the machine taken on the line indicated at 4—4 in Fig. 3.
Figures 5, 6, 7, 8:
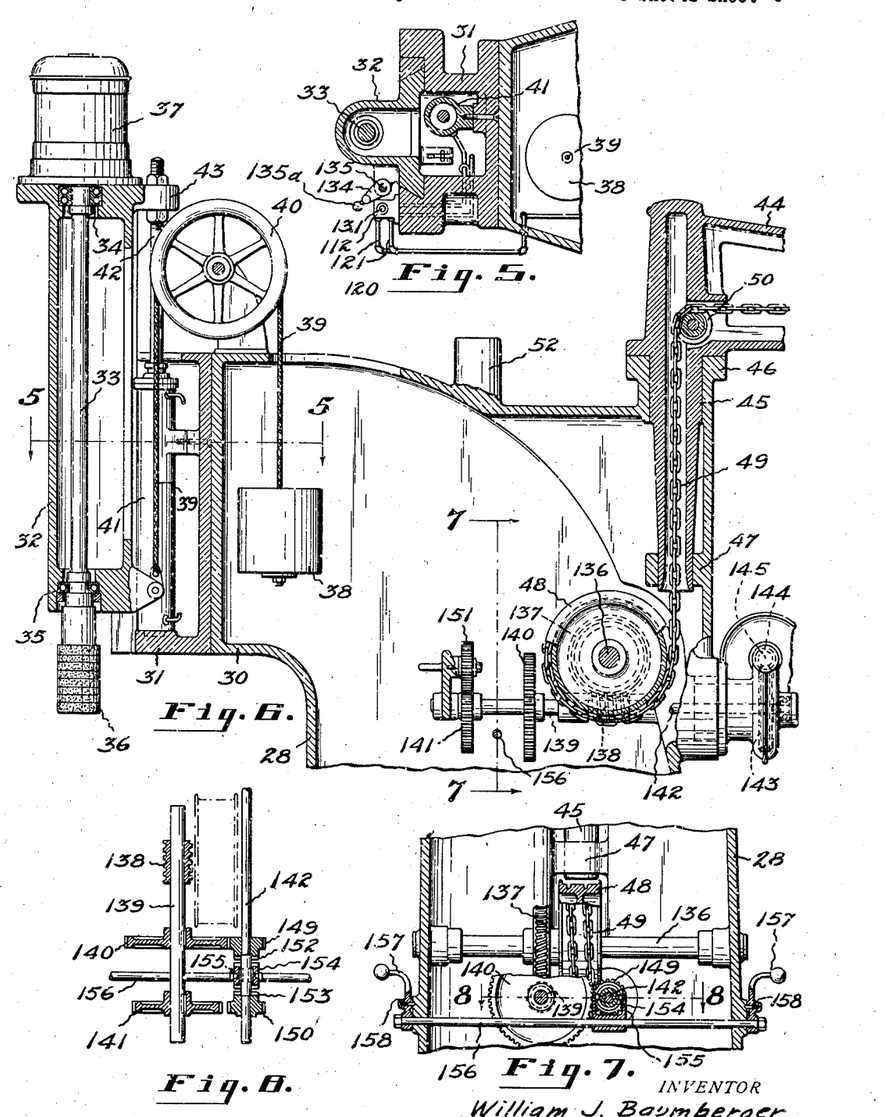
Fig. 5 is a horizontal section through the spindle carrying head taken on the line indicated at 5—5 in Fig. 6.
Fig. 6 is a vertical section through the upper portion of the standard and the spindle carrying head mounted thereon.
Fig. 7 is a section taken on the line indicated at 7—7 in Fig. 6.
Fig. 8 is a sectional view of the line indicated at 8—8 in Fig. 7.

As best shown in Figs. 2 and 3 of the drawings, the sub-base 5 may be swung about the pivot 3 to position the work table 13 at one end or the other of the arcuate track 4. When the table is positioned substantially midway between the ends of the track 4, the work is positioned centrally beneath the spindle carrying head, but when the work carrying table is positioned at either end of the track 4, it lies wholly to one side of the spindle carrying head so that a piece of work such as a car wheel can be readily lifted off of or lowered onto the work supporting table.

To facilitate the loading or unloading of the work table, a suitable hoist is mounted on the standard 28 for raising and lowering the work. As herein shown, the hoist is in the form of a crane having a horizontally swinging jib 44 pivoted to the top of the standard 28 by means of a vertical hollow trunnion 45 integral with the jib at its inner end and journaled in bearings 46 and 47 formed in the standard 28 at the rear side thereof. Mounted within the standard below the lower end of the hollow trunnion 45, there is a winding drum 48 to which is attached a hoist chain 49 which extends from the drum upwardly through the hollow trunnion 45 and over guide sheaves 50 and 51 at the inner and outer ends of the jib 44. The free end of the chain is provided with suitable means for engaging and supporting the work to hoist the work off of or lower the work onto the work table. By means of the crane above described, a car wheel or other piece of work may be lifted from the floor or from a truck adjacent the machine and deposited on the work table or a finished piece of work may be lifted from the work table and deposited on the floor or on a truck positioned alongside the machine.

Ordinarily, the finished work pieces will be discharged at one side of the machine and the work pieces to be operated upon will be delivered to the work table from the opposite side of the machine.

As clearly shown in Fig. 2, the jib 44 is adapted to swing to a position overhanging either end of the track 4 so that the crane may be used to handle the work pieces to and from the work table on either side of the machine, a suitable stop pin 52 being provided at the top of the standard 28 to limit the swinging movement of the jib and prevent the free end thereof from engaging with the sheave 40 or spindle carrying head 32.

The various mechanisms for rotating the work table reciprocating the spindle carrying head, turning the sub-base to shift the work table and for operating the crane, are all operated from a single driving shaft 53 which extends along the rear side of the machine. The shaft 53 is supported by suitable bearing brackets 54 attached to the base portion 29 of the standard 28 and is driven by means of an electric motor 55, also attached to the base portion 29 of the standard. The shaft of the motor 55 is attached to one end of the shaft 53 and the opposite end of the shaft has fixed thereto a worm 56 which meshes with a worm gear 57 fixed to a shaft 59 extending forwardly along one side of the base. See Figs. 3 and 10.

Figure 10:
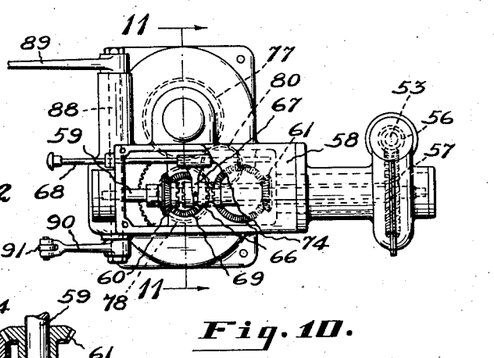
Fig. 10 is a side elevation of the gearing through which the sub-base which carries the work holder is operated.
Figure 11:
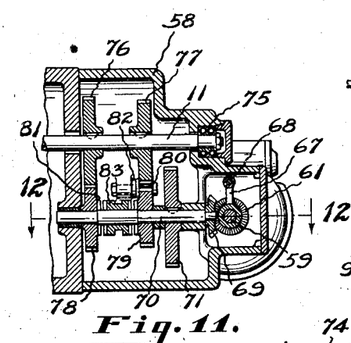
Fig. 11 is a section taken on the line indicated at 11—11 in Fig. 10.
Figure 12:
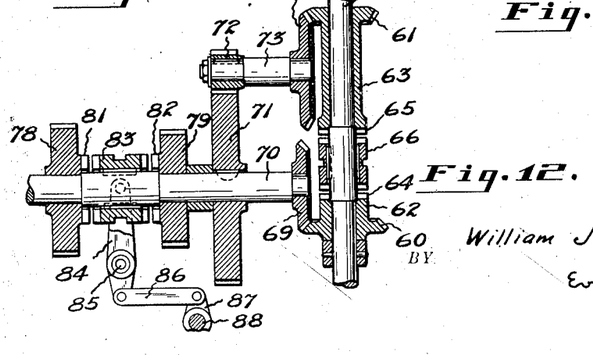
Fig. 12 is a section taken on the line indicated at 12—12 in Fig. 11.

The shaft 11, which operates the sub-base 5 to shift the work table is driven through reversing and speed changing gears driven by the worm 56, the reversing and speed changing gearing being mounted within a housing 58 secured to the base at one side thereof. As best shown in Figs. 10, 11 and 12 of the drawings, the worm gear 57 is fixed to a shaft 59 which has rotatably mounted thereon, two bevel gears 60 and 61 which are provided with elongated hubs 62 and 63 formed with clutch teeth 64 and 65 at their inner ends. Between the tooth ends of the hubs 62 and 63, there is a clutch sleeve 66 splined to the shaft 59 and movable into engagement with the clutch teeth of either of the gears 60 or 61. The clutch sleeve 66 may be moved from a neutral position into engagement with either of the gears 60 or 61 by means of a yoke 67 which is attached to a rod 68 extending parallel with the shaft 59 and slidably mounted in the housing 58. A small bevel gear 69 meshes with the bevel gear 60 and this bevel gear is fixed to a shaft 70 which has fixed thereto a large gear 71 which meshes with a pinion 72 fixed to a counter shaft 73 to which is also fixed a bevel gear 74 larger than the bevel gear 69, the bevel gear 74 meshing with the bevel gear 61. When the clutch sleeve 66 is held in a neutral position, the gears 60 and 61 and the shaft 70 are held against rotation. When the clutch sleeve 66 is engaged with the bevel gear 60, the shaft 70 is driven through the bevel gears 60 and 69 at a speed approximately the same as that of the shaft 59. When the clutch 66 is engaged with the gear 61, the shaft 70 is driven in the same direction as before, but at a much lower speed through the gear 61, 74, 72 and 71. The shaft 70 is parallel with the shaft 11 and is positioned directly below the outer end of the shaft 11 which projects through the wall of the base and is journaled in a bearing 75 in the outer side wall of the housing 58.

Two spur gears 76 and 77 are fixed to the shaft 11 within the housing 58, the gear 76 meshing with a gear 78 rotatably mounted on the shaft 70 and the gear 77 driving a second gear 79 rotatably mounted on the shaft 70 through an intermediate gear 80. The inner faces of the gears 78 and 79 are provided with clutch teeth 81 and 82 which are engageable with teeth on the ends of a clutch sleeve 83 which is splined to the shaft 70 between the gears 78 and 79.

The clutch sleeve 83 is adapted to be moved from a neutral position to a position in engagement with either of the gears 78 or 79 by means of a yoke lever 84 pivoted intermediate its ends at 85 and connected by a link 86 to an actuating arm 87 fixed to a vertical rock shaft 88 journaled in the forward end portion of the housing 58 and provided at its upper end with a handle 89 by means of which the shaft may be turned to shift the sleeve 83 into engagement with either of the gears 78 or 79. When the clutch sleeve is in engagement with the gear 78, the shaft 11 is driven from the shaft 70 through the gears 78 and 76 and when the clutch sleeve 83 is in engagement with the gear 79, the shaft 11 is driven in the opposite direction through the gears 79, intermediate gear 80 and gear 77, the movement of the sleeve 83 from a position engaging the gear 78 to a position engaging the gear 79, causing the direction of rotation of the shaft 11 to be reversed. The rock shaft 88 has an arm 90 fixed to its lower end and to the outer end of this arm, there is pivoted a rod 91 which extends transversely across the frame beneath the rearwardly extending arm 8 of the sub-base. At the opposite side of the frame, the rod 91 is pivoted to the outer end of an arm 92 which is fixed to the lower end of a vertical rock shaft 93 journaled in the brackets 94 and having a handle 95 attached to its upper end. By means of the handles 95 and 89, an operator at either side of the machine may reverse the direction of rotation of the shaft 11 to reverse the direction of movement of the sub-base 5 by operating one or the other of the handles. By adjusting the rod 68, the shaft 11 may be driven at a relatively high speed for shifting the work table to a position clear of the spindle carrying head or the shaft 11 may be driven at a slow speed to impart a very slow movement to the sub-base to feed the work to the grinding wheel or other tool carried by the spindle.

It is desirable that automatic means be provided to stop the operation of the shaft 11 at the limits of movement of the sub-base to prevent movement of the sub-base beyond the ends of the track 4 and so that the worm 10 will not run out of engagement with the worm gear segment 9. Means is therefore provided to automatically shift the clutch sleeve 83 to neutral position when the sub-base 5 has reached either of its limits of lateral movement. To this end, the rod 91 is provided substantially midway between its ends with an upwardly projecting lug 96 and the under side of the arm 8 is provided adjacent opposite sides thereof with downwardly projecting stop members 97 which engage with the lug 96 to shift the rod 91 and move the clutch sleeve 83 to a neutral position.

The hydraulic motor 23, which drives the work supporting table 13, is supplied with liquid under pressure through conduits 98 and 99 which have flexible portions and which extend from the motor 23 to a pump 100 mounted upon the base portion 29 of the standard adjacent the rear end of the machine. The pump 100, which delivers liquid to the motor 23 is operated from the drive shaft 53 by means of a belt 101, which extends over pulleys 102 and 103 fixed to the pump shaft and to the shaft 53 respectively, a suitable clutch operated by a shifter arm 104 being provided to disconnect the pump from the power shaft when desired.

Communication between the pump 100 and conduits 98 and 99 is through a suitable regulating valve 105 by means of which the rate of flow of liquid from the pump 100 to the motor 23 may be accurately regulated to cause the motor 23 to operate at any desired speed within relatively wide limits so that the speed of rotation of the work may be so regulated that the proper linear travel of the grinding wheel with respect to the surface upon which it is operating is maintained. The regulating valve is of the sliding type having a stem 106 to which is attached an actuating rack 107 which may be shifted longitudinally by means of a shaft 108 journaled in the standard 28 having a pinion engaging the rack and having a handle 109 by means of which it may be turned to effect the desired adjustment of the valve.

Figure 9:
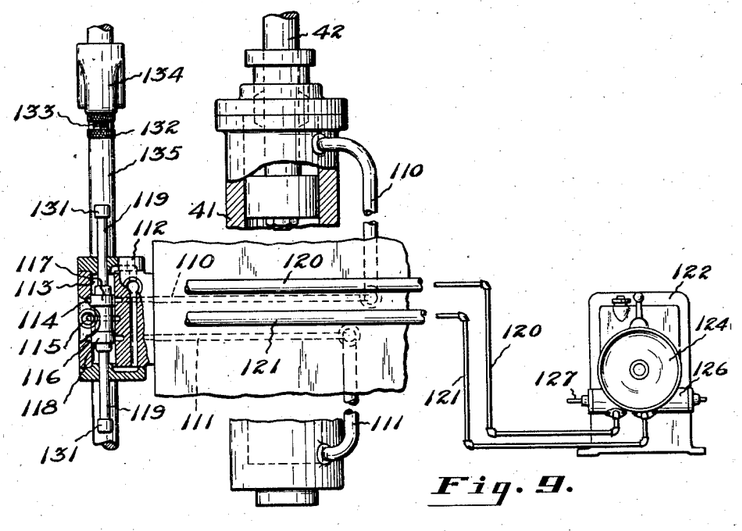
Fig. 9 is a diagrammatic detail view showing the pressure connections to the hydraulic cylinder which operates the spindle carrying head.

As best shown in Fig. 9 of the drawings, the spindle head actuating cylinder 41 is supplied with liquid under pressure through pipes 110 and 111 which communicate with the upper and lower ends of the cylinder. The pipes 110 and 111 communicate with a reversing valve 112 which has a cylinder 113 provided with three circumferential grooves 114, 115 and 116, and the valve is in the form of a spool having spaced pistons 117 and 118 which have a close fit in the cylinder and which are spaced apart a distance slightly greater than the space between the central groove 115 and the grooves 114 and 116, the valve having a stem 119 projecting through the heads at opposite ends of the cylinder 113. Liquid supply pipes 120 and 121 extend from a pump 122 mounted on the base portion 29 of the standard adjacent the rear end of the machine to the reversing valve 112. The pipe 120 communicates with the opposite end portions of the cylinder 113 and the pipe 121 communicates with the central groove 115 of the cylinder. The pipe 110 communicates with the upper groove 114 and pipe 111 communicates with the lower groove 116.

When the spool valve is in one extreme position in the cylinder 113, liquid under pressure is admitted to the pipe 110 through the central groove 115 and the upper groove 114 and when the spool valve is at the opposite end of the cylinder, pressure is admitted to the lower end of the cylinder 41 through the pipe 111, the central groove 115 and lower groove 116. When one of the pipes 110 or 111 is connected through the valve 112 to the pressure line, the other pipe is connected through the end of the cylinder 113 with the exhaust.

The pump 122 is driven by a belt 123 extending over pulleys 124 and 125 fixed to the pump shaft and to the drive shaft 53 respectively. The rate of delivery of liquid from the pump 122 to the spindle head actuating cylinder 41 may be accurately regulated to control the speed of movement of the head by means of a flow regulating valve 126 through which liquid is delivered from the pump 121 to the pipes 120 and 121. The regulating valve is of the sliding type having a valve stem 127 which is connected to an actuating rack 128 which may be moved by means of a pinion on a shaft 129 journaled in the standard 28 and having a handle 130 by means of which it may be operated. By adjusting the handle 130, the linear speed at which the spindle carrying head 32 is moved by the cylinder 41 may be accurately regulated.

In order to obtain continuous reciprocation of the spindle carrying head, means is provided for automatically shifting the reversing valve 112 to reverse the direction of movement of the head. To this end, the projecting ends of the valve stem 119 are provided with heads 131 which are engageable with adjustable stop members 132 which are the heads of screws 133 which are vertically disposed and threaded into arms 134 attached to a vertical shaft 135 which is provided with a handle 135ᵃ and which is journaled in brackets 135ᵇ integral with the vertically movable head 32. Upon downward movement of the head, the valve 112 is pushed to its uppermost position reversing the pressure connections to admit pressure beneath the piston of the cylinder 41 and when the head approaches its uppermost position, the valve 112 is shifted to its lowermost position so that pressure will be delivered through pipe 110 to the upper end of the cylinder 41. The length of the stroke of the spindle carrying head may be varied by adjusting the screws 133 and if it is desired to retain the head in its uppermost or lowermost position, the shaft 135 may be swung laterally by means of the handles 135ᵃ so that the stops 132 are out of the path of the valve stem 19 so that pressure will be maintained against the actuating piston to hold the head in one extreme position or the other. The valve 112 may be operated manually when desired to cause actuation of the head in either direction or to position the valve in a neutral position to retain the head at any desired position intermediate the ends of its stroke.

The hoist drum 48 is also driven from the power shaft 53 through gearing which will now be described:

The drum 48 is fixed to a transverse shaft 136 which is journaled in the walls of the standard 28 and this shaft has fixed thereto a worm gear 137 which meshes with a worm 138 on a shaft 139. The shaft 139 has fixed thereto spur gears 140 and 141 and these gears may be driven selectively from a shaft 142 parallel to the shaft 139. The shaft 142 has fixed thereto a worm gear 143 which meshes with a worm 144 fixed to a shaft 145 outside the standard and the shaft 145 has fixed thereto a pulley 146 driven by a belt 147 which extends over a pulley 148 fixed on the shaft 53. The shaft 142 has rotatably mounted thereon two gears 149 and 150. The gear 149 meshes with the gear 140 and the gear 150 is connected to the gear 141 through an intermediate gear 151. The inner faces of the gears 149 and 150 have clutch teeth 152 and 153 and an intermediate clutch sleeve 154 splined to the shaft 142 has teeth at the ends thereof engageable with the teeth 152 and 153. The clutch sleeve 154 is movable from a neutral position out of engagement with both gears to a position in engagement with either of the gears by means of a yoke 155 attached to a rock shaft 156 which extends transversely through the standard 28 beneath the shafts 139 and 142, the opposite ends of the rock shaft 156 outside the standard 28 being provided with handles 157, and each of these handles is provided with a spring detent 158 engageable with suitable indentations in the outer face of the standard to yieldingly hold the rock shaft in adjusted positions with the clutch sleeve 154 in engagement with either of the gears 149 or 150 or with the sleeve in a neutral position. When the sleeve 154 is in engagement with the gear 149, the drum 48 is driven in one direction and when the sleeve 154 is in engagement with the gear 150, the drum is driven in the opposite direction. With the sleeve 154 in intermediate position, the drum is held stationary by the worm 138 and when the crane is not in use, the detents 158 serve to hold the operating shaft in its neutral position in which the yoke 155 holds the sleeve 154 out of engagement with both the gears. In order to effectively discharge particles of metal and abrasive which are dislodged from the work and from the surface of the grinding wheel, the trunnion 14 of the work table is provided with an axial bore 159 which has a flaring upper end portion 160 providing a wide opening immediately beneath the grinding wheel so that any dislodged particles will tend to fall by gravity into the opening in the table. Immediately beneath the lower ends of the trunnion 14, the base 1 is provided with an aperture 161 and to the under side of the aperture, there is attached a suction conduit 162 which leads to a suction air pump 163 which is driven by a belt 164 extending over a pulley 165 attached to the shaft of the pump and over a pulley 166 fixed to the drive shaft 53. The suction created by the pump 163 creates a downward air current through the bore of the work and over the surface of the grinding wheel into the suction conduit so that particles of dust, metal and abrasive are drawn down into the suction conduit and discharged through the pump 163.

To load the work holder 1, the sub-base 5 is shifted to one of its lateral limits of movement by operating the shaft 11 through the gear 60 on the shaft 59 and a work piece, such as a car wheel is hoisted by means of the drum 48 and chain 49 to a position above the work table and positioned centrally over the table by swinging the jib 44. The chuck jaws 24 are then adjusted to proper positions to receive the work and the work is lowered onto the table. The sub-base 5 is then swung back to central position by operating one of the levers 89 or 95 to shift the clutch sleeve 83 into engagement with the gear 78 or 79 to drive the shaft 11 in the proper direction to return the sub-base. When the sub-base reaches its central position, its movement may be stopped by actuating either of the levers 89 or 95 to shift the clutch sleeve 83 to neutral position. The spindle carrying head may be lowered under manual control and at the desired speed by manipulating the valves 112 and 126 and after the work table is properly positioned to permit the grinding wheel or other tool at the lower end of the spindle to enter the bore to be finished, the arms 134 may be swung to operative position so that continuous reciprocating motion may be imparted to the spindle carrying head. The work table may then be rotated by starting the pump 100 into operation and setting the speed regulator valve 101 to the proper position to obtain the desired speed of rotation of the work. The electric motor 37 may also be started into operation to drive the spindle and the rod 68 will then be adjusted to drive the shaft 11 at a slow speed and the clutch 83 will be moved to an engaging position so that a slow lateral feed movement is imparted to the sub-base 5, causing the work to be moved laterally at a slow speed to bring the internal surface to be ground into engagement with the grinding wheel.

The grinding operation will then be continued until the desired amount of metal has been removed from the bore, whereupon the spindle head will be stopped in its uppermost position, the rod 68 shifted to drive the shaft 11 at its higher speed and the clutch sleeve 83 shifted into engagement with the proper gear for driving the shaft 11 in the direction to rapidly shift the work table in the desired direction along the track 4.

The finished work piece will then be removed from the work table by means of the crane and replaced by an unfinished work piece. The speed of rotation of the work and the speed of longitudinal movement of the grinder spindle may be accurately adjusted during the operation of the machine by adjusting the valves 105 and 126, so that the speed of travel of the grinding wheel over the surface being ground may be accurately regulated to obtain the most effective grinding action for any particular job.

It will be apparent that the present invention provides a machine by which internal surfaces may be ground smoothly, accurately and quickly, which is of relatively simple and compact construction, in which all adjustments are power operated under manual control, and in which relatively heavy work pieces may be quickly and easily inserted in or removed from the machine.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a machine of the character described, a supporting frame having a base with a fixed standard thereon, a vertical spindle mounted for rotation and axial movement on said standard, a sub-base mounted for lateral movement on said base about a vertical axis spaced from the axis of said spindle, a work support rotatably mounted on said sub-base to turn about a vertical axis spaced from the pivotal axis of the sub-base substantially the same distance as the axis of said spindle, means for driving said spindle, means including a motor mounted on the sub-base for driving said work support, means for moving said spindle vertically, means for shifting said sub-base about its axis to move the work support laterally with respect to the spindle, and means for driving said sub-base shifting means including a reversing mechanism and a change speed mechanism.

2. In a machine of the character described, a supporting frame having a base provided with an arcuate track along the forward end thereof and a standard mounted on the base rearwardly of said track, a sub-base mounted on said base for movement about a vertical pivot concentric with said arcuate track, said sub-base having a portion resting on said track and a portion extending rearwardly of said pivot, a work support mounted on the sub-base directly over said track for rotation about a vertical axis, means operatively connected to the rearwardly extending portion of the sub-base for swinging said sub-base about its pivot, a vertical spindle mounted on said standard and positioned over said track, means for driving said spindle, and means for driving said work support.

3. In a machine of the character described, a supporting frame having a base provided with an arcuate track along the forward end thereof, and a standard mounted on the base rearwardly of said track, a sub-base mounted on said base for movement about a vertical pivot concentric with said arcuate track, said sub-base having a portion resting on said track and a portion extending rearwardly of said pivot, a work support mounted on the sub-base directly over said track for rotation about a vertical axis, means operatively connected to the rearwardly extending portion of the sub-base for swinging said sub-base about its pivot, a vertical spindle mounted on said standard and positioned over said track, means for driving said spindle, means for driving said work support, and means for reciprocating said spindle axially.

4. In a machine of the character described, a supporting frame having a base provided with an arcuate track along the forward end thereof and a standard mounted on the base rearwardly of said track, a sub-base having a portion supported on said track and mounted for movement about a pivot concentric with said track, a vertically movable head mounted on said standard and over-hanging the central portion of said track, a vertical spindle journaled in said head, a work support rotatably mounted on said sub-base directly over said track, means for driving said spindle, means for driving said work support, and means for moving said sub-base laterally about its pivot to shift said work support to a position laterally clear of said spindle.

5. In a machine of the character described, a supporting frame having a base provided with an arcuate track along the forward end thereof and a standard mounted on the base rearwardly of said track, a sub-base having a portion supported on said track and mounted for movement about a pivot concentric with said track, a vertically movable head mounted on said standard and over-hanging the central portion of said track, a vertical spindle journaled in said head, a work support rotatably mounted on said sub-base directly over said track, means for driving said spindle, means for driving said work support, means for imparting to said sub-base, a relatively slow movement angularly about its pivot, to feed the work relative to said spindle and a relatively rapid movement to shift said work support to a position laterally clear of said spindle.

6. In a machine of the character described, a work holder mounted to rotate about a vertical axis, a support for the work holder mounted to swing about an axis spaced laterally from the work holder, a vertically movable spindle head, a vertical spindle carried by the head adapted to support a tool in position to engage the work, means for driving the spindle, means for driving the work holder, means for moving the work holder support slowly about its pivotal axis to feed the work holder laterally with respect to said spindle, and means for controlling said support moving means to impart a relatively rapid movement to the work holder support in either direction to shift the work holder support to or from its working position.

7. In a machine of the character described, a work holder mounted to rotate about a vertical axis, a support for the work holder mounted to swing about an axis spaced laterally from said work holder, a vertically movable spindle head, a vertical spindle carried by the head adapted to support a tool in position to engage the work, means for driving the spindle, means for driving the work holder, and means for imparting a slow angular feed movement to the work holder support, and for imparting a relatively rapid angular movement to said support to shift the work holder to a position laterally clear of said spindle.

8. In a machine of the character described, a work holder mounted to rotate about a vertical axis, a support for the work holder mounted to swing about an axis spaced laterally from said work holder, a vertically movable spindle head, a vertical spindle carried by the head adapted to support a tool in position to engage the work, means for driving the spindle, means for driving the work holder, means for reciprocating said spindle carrying head, and mechanism for imparting angular movement to said work holder support including gearing for actuating said support, means for driving said gearing including a reversing mechanism for changing the direction of movement of said support and a change speed mechanism whereby a slow feed movement may be imparted to said support or a relatively rapid movement may be imparted thereto to shift the work holder into or out of its working position.

9. In a machine of the character described, a work holder mounted to rotate about a vertical axis, a support for the work holder mounted to swing about an axis spaced laterally from said work holder, a vertically movable spindle head, a vertical spindle carried by the head adapted to support a tool in position to engage the work, means for driving the spindle, a drive shaft, independent means operated from said drive shaft for moving said work holder support about its pivotal axis, for moving said spindle head and for driving said work holder, and manually operated means for controlling each of said moving and driving means.

WILLIAM J. BAUMBERGER.